(12) United States Patent
Luce

(10) Patent No.: US 6,490,917 B1
(45) Date of Patent: Dec. 10, 2002

(54) MAGNETOSTRICTIVE PRECIPITATION GAGE

(75) Inventor: Charles H. Luce, Boise, ID (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 112 days.

(21) Appl. No.: 09/637,031

(22) Filed: Aug. 10, 2000

(51) Int. Cl.$^7$ ................................................ G01W 1/14
(52) U.S. Cl. ................................................. 73/170.22
(58) Field of Search ........................ 73/170.22, 170.17, 73/170.18, 170.19, 170.21, 305–322, 432.1, 322.5, 864.01, 290 R, 170.16, 170.23; 324/209

(56) References Cited

U.S. PATENT DOCUMENTS

| | | | | |
|---|---|---|---|---|
| 2,497,759 A | * | 2/1950 | Cappleman, Jr. | 346/72 |
| 3,393,559 A | * | 7/1968 | Oviatt | 346/72 |
| 3,487,684 A | * | 1/1970 | Chadwick | 73/170.21 |
| 4,106,336 A | * | 8/1978 | Marley | 73/170.17 |
| 4,233,841 A | * | 11/1980 | Abele | 73/170.17 |
| 4,430,212 A | * | 2/1984 | Gutierrez et al. | 210/104 |
| 4,750,117 A | | 6/1988 | Gregory | 364/563 |
| 4,839,590 A | | 6/1989 | Koski et al. | 324/208 |
| 5,016,196 A | * | 5/1991 | Nelson et al. | 340/602 |
| 5,245,874 A | * | 9/1993 | Baer | 73/313 |
| 5,864,059 A | | 1/1999 | Sturm et al. | 73/432.1 |
| 6,003,388 A | * | 12/1999 | Oeftering | 73/864.01 |
| 6,038,920 A | * | 3/2000 | Gilbert et al. | 73/170.23 |

* cited by examiner

Primary Examiner—Eric S. McCall
(74) Attorney, Agent, or Firm—M. Howard Silverstein; John D. Fado; Janet I. Stockhausen

(57) ABSTRACT

A magnetostrictive precipitation gage includes a catch tube having an upper opening configured to receive precipitation therein. A vertical magnetostrictive rod and corresponding magnetic float linearly displaceable thereon are used to determine the fluid level within the catch tube. More particularly, as the fluid level fluctuates in the catch tube, so will the vertical position of the float, which interacts magnetically with the magnetostrictive rod. Accordingly, the vertical position of the float may be detected to determine the fluid level within the catch tube, and calculations regarding precipitation may be performed.

18 Claims, 3 Drawing Sheets

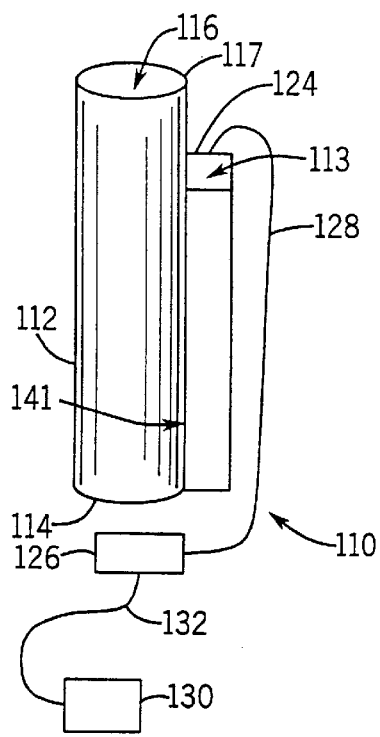
FIG. 7
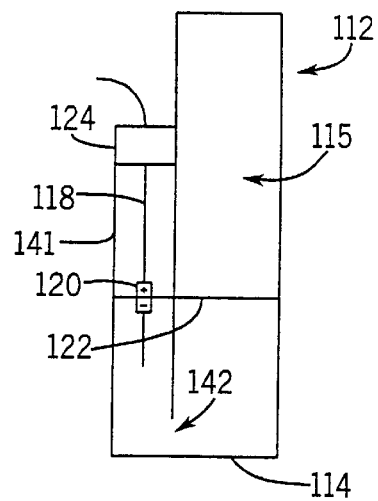
FIG. 8
FIG. 9
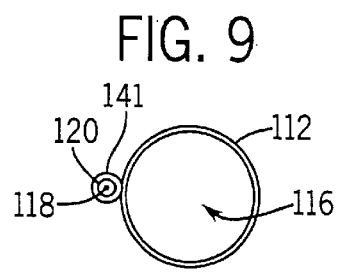

MAGNETOSTRICTIVE PRECIPITATION GAGE

BACKGROUND OF THE INVENTION

1. Field of the Invention

The present invention relates to precipitation gages and, more particularly, relates to a precipitation gage using a magnetostrictive transducer to measure precipitation levels.

2. Discussion of the Related Art

Precipitation gages are well known to include a generally cylindrical cavity having an upwardly facing opening configured to collect precipitation, such as rain or snow. Conventional precipitation gages typically include mechanical mechanisms that output signals indicative of the amount of precipitation within the cylinder. For instance, a precipitation gage may include a spring or other type of compressive element that is positioned at the bottom of the cylinder and compresses as precipitation accumulates within the cylinder. The amount of compression is thereby converted to the amount of precipitation based on the known spring constant.

Another precipitation gage currently used includes a pressure transducer that outputs signals corresponding to the amount of pressure sensed within the cylinder, which will change according to the amount of precipitation within the cylinder.

The amount of spring compression or, alternatively, the signals output by the pressure transducer are fed into a data manipulation system, which translates the signals into measured precipitation levels. Unfortunately, these precipitation gages are subject to fluctuations due to the wide variations in ambient temperature that occur throughout a given year, which affect the sensitivity of the spring constant, and additionally affect the ambient pressure which could thereby limit the effectiveness of a pressure transducer. Spring gages are additionally costly to manufacture.

What is therefore needed is a precipitation gage that is robust to temperature fluctuations, and that is relatively inexpensive to manufacture.

BRIEF SUMMARY OF THE INVENTION

In accordance with a first aspect of the invention, a magnetostrictive precipitation gage includes an elongated catch tube having an upwardly facing opening and a base and is configured to receive precipitation therein. A magnetostrictive transducer includes a rod extending upwardly from the base and a corresponding buoyant magnetized float that is linearly displaceable along the rod. Therefore, as precipitation accumulates within the catch tube, the rod senses the placement of the float and the magnetostrictive transducer outputs voltage signals to a data logger, which is configured to process the voltage signals and output data reflecting the precipitation levels over a given period of time.

These as well as other features and characteristics of the present invention will be apparent from the description which follows. In the detailed description below, preferred embodiment of the invention will be described with reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

Preferred exemplary embodiments of the invention are illustrated in the accompanying drawings in which like reference numerals represent like parts throughout, and in which:

FIG. 7 is a perspective view of a precipitation gage in accordance with another embodiment of the present invention;

FIG. 8 is a sectional side elevation view of the precipitation gage of FIG. 7; and FIG. 9 is a top plan view of the precipitation gage of FIG. 7.

DETAILED DESCRIPTION OF THE INVENTION

Figure 1:
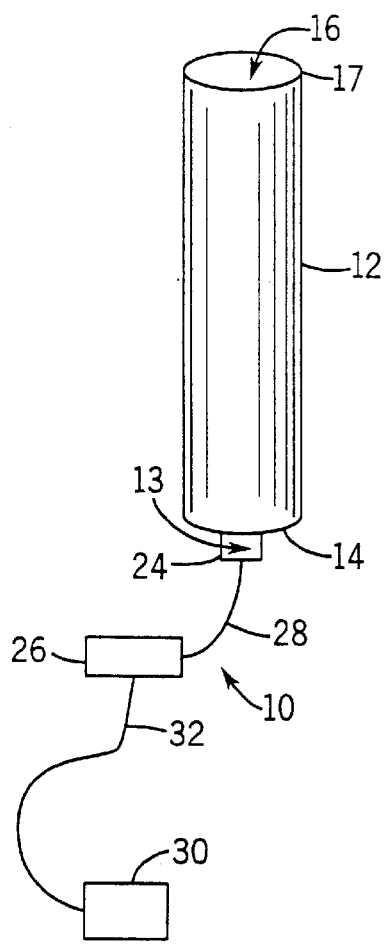
FIG. 1 is a perspective view of a precipitation gage in accordance with one embodiment of the present invention.
Figure 2:
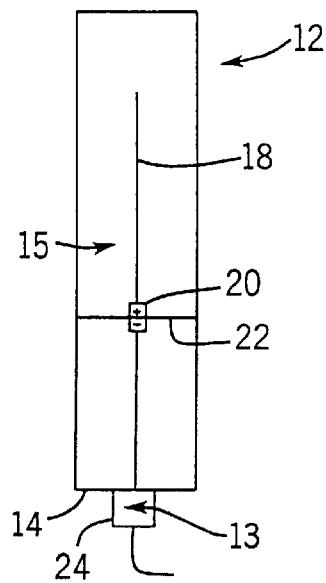
FIG. 2 is a sectional side elevation view of the precipitation gage of FIG. 1.
Figure 3:
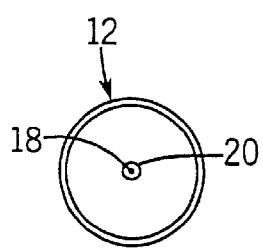
FIG. 3 is a top plan view of the precipitation gage of FIG. 1.

Referring initially to FIGS. 1–3, a precipitation gage 10 includes an elongated cylindrical catch tube 12 having a bottom wall 14 and defining an inner cavity 15 having an upper opening 16. The upper walls 17 of the catch tube 12 are beveled so as to prevent the accumulation of snow on the catch tube, which could result in the accumulation of inaccurate precipitation levels within the catch tube 12. The diameter of the catch tube is preferably between 6 and 12 inches, and is uniform throughout the tube so as to provide accurate measurements of precipitation. The upper walls 17 of the catch tube 12 are beveled so as to prevent the accumulation of snow on the catch tube, which could result in the accumulation of inaccurate precipitation levels within the catch tube 12. The catch tube 12 may be made of a plastic, metal, fiberglass, or any other material suitable for collecting precipitation. A larger diameter of catch tube 12 is preferable so as to provide a greater sampling area for the precipitation gage. 10. In operation, it is desirable to partially fill the catch tube 12 with antifreeze initially so that as precipitation falls, it melts, thereby increasing the accuracy of the precipitation gage 10. The antifreeze also prevents fluid already in the gage from freezing. As precipitation accumulates, the antifreeze will become dilute, so the initial charge of antifreeze should be sufficiently deep so as to provide adequate protection as the catch tube 12 fills. A surface coating of oil on the top of the fluid in the catch tube 12 prevents evaporation of the fluid.

The precipitation gage 10 includes a magnetostrictive transducer 13 having a generally cylindrical magnetostrictive rod 18 extending upwardly from the bottom wall 14. The upper walls 17 of the catch tube 12 are beveled so as to prevent the accumulation of snow on the catch tube, which could result in the accumulation of inaccurate precipitation levels within the catch tube 12. Preferably, the rod 18 has a length of one foot to provide high precision in measurement, or can be up to two or three feet long for gages where considerable precipitation is expected with infrequent maintenance. It should be appreciated that a shorter rod 18, while providing for greater accuracy, would necessitate emptying of the precipitation gage 10 at more frequent intervals. It has been determined that the precision of a gage 10 having a one-foot rod is approximately 0.005 inches using a commonly available data logger 26.

A float 20 is mounted on the rod 18 for sliding displacement therealong, and contains a generally circular magnet therein. As a result, as the fluid level 22 lowers and rises within the catch tube 12, the float 20 will be displaced up and down accordingly. The rod.18 includes a magnetostrictive wire extending from the tip of the rod 18 through the bottom wall 14 and into a magnetostrictive transducer head 24. The head 24 may be protected by the ambient environment by providing a housing that is attached to the outside of bottom wall 14 so as to encapsulate the head. For the sake of convenience and clarity, the combination of the housing and magnetostrictive transducer head will hereinafter referred to as the head 24. The head 24 encloses electronics for use in combination with magnetostrictive wires enclosed within the rod 18 to produce a voltage output indicating the location of the float 20 with reference to the rod 18. The magnetostrictive transducer is powered by a power supply 30 via electrical wire 32. It has been determined that a relatively accurate and linear response may be obtained using a 12-volt power supply. One such magnetostrictive transducer is described in more detail in U.S. Pat. No. 4,839,590, the disclosure of which is hereby incorporated by reference. It should be appreciated, however, that alternative magnetostrictive transducer designs exist, and the present invention is not intended to be limited to the configuration described above.

With continuing reference to FIG. 1, a data logger 26 is connected to the magnetostrictive transducer head 24 via an electrical wire 28 that inputs varying voltage signals corresponding to the fluid level 22, as indicated by the interaction between rod 18 and float 20, from the head 24. The data logger includes electronic circuitry to compute and output statistical information regarding precipitation levels that are experienced over a given period of time. While the catch tube 12 is illustrated as being generally cylindrical in accordance with the preferred embodiment, it should be appreciated that the tube may be of any other suitable configuration, for example, rectangular. Accordingly, the catch tube 12 is not intended to be limited to cylindrical structures.

Figure 5:
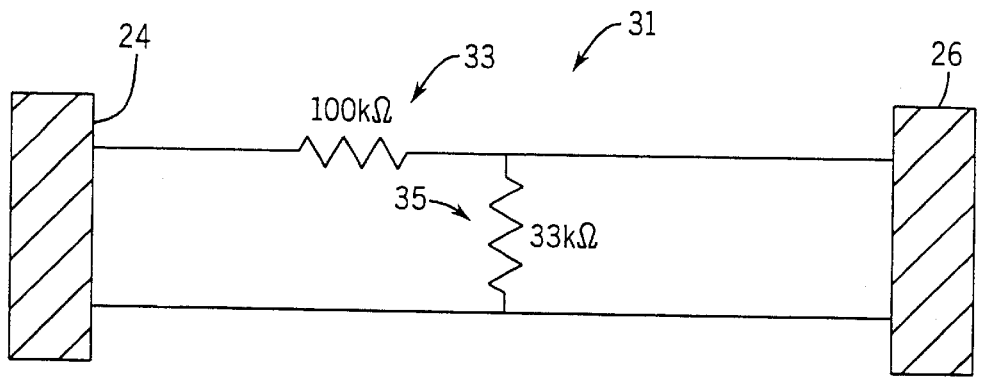
FIG. 5 illustrates a schematic circuit usable in combination with the data collection circuitry in accordance with the precipitation gage of FIG. 1.

Conventional magnetostrictive transducers may output voltages ranging from zero to 10 volts, while conventional data loggers are capable of reading up to 2.5 volts, and sometimes up to 5 volts. Accordingly, referring now to FIG. 5, the electrical connection 28 includes a voltage splitter 31, which reduces the relatively high voltage output from head 24 to acceptable values that are processed by the data logger 26. Specifically, the voltage splitter 31 includes a resistor 33 that is connected in series with a resistor 35 and the data logger 26. One having skill in the art will recognize that the voltage drop in this configuration will equal the resistance of resistor 35 divided by the sum of resistances of resistors 33 and 35. Accordingly in the illustrated embodiment, a ten voltage output from the head 24 will input to the data logger 26 as 10*(33/133)=2.5 volts. It should further be appreciated that if resistor 33 was modified to include a resistance of 33 kilo-ohms, the resulting input to the data, logger would equal 5 volts.

It should be recognized that the voltage splitter 31 described above may not be necessary in configurations wherein the magnetostrictive transducer outputs voltage values that are acceptable to the data logger and that alternative voltage splitter configurations may be necessary so as to accommodate various data loggers.

Figure 4:
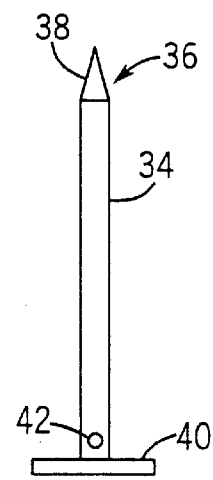
FIG. 4 is a rod cover that may optionally be used in combination with the precipitation gage of FIG. 1.

Referring to FIG. 4, a rod cover 36 includes a generally cylindrical pipe 34 having a conical top 38 and is hollow so as to fit over the magnetostrictive rod 18. The diameter of the cover 36 is sufficiently large so as to fit over the float 20. The cover 36 is particularly useful during deep snowfall events, where a danger exists that the float 20 could become covered by snow, thereby preventing an accurate response, which could render the precipitation gage 10 inoperative for a substantial period of time. The cover 36 further includes a base plate 40 to provide support to the cover when it is mounted within the catch tube 12. One or more holes 42 extending through the pipe 34 near the bottom so as to permit precipitation entering the catch tube 12 to travel within the pipe, thereby activating the floater 20.

Figure 6:
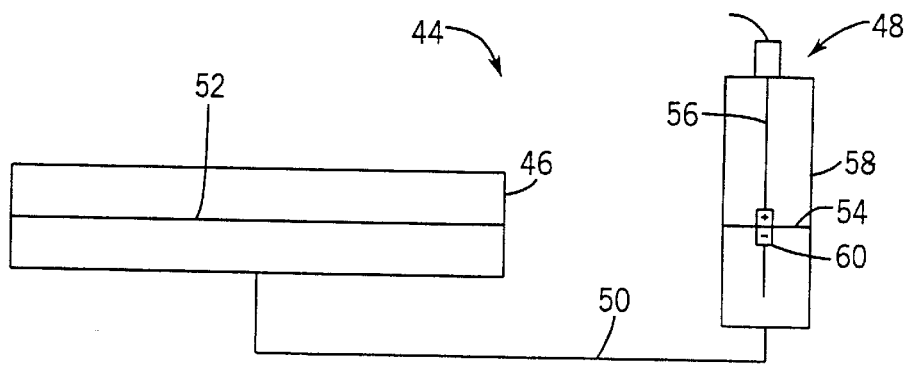
FIG. 6 is a schematic view of an evaporation pan gage employing a magnetostrictive transducer in accordance with the preferred embodiment.

Referring now to FIG. 6, an evaporation sensor 44 includes an evaporation pan 46 that is in fluid communication with a fluid reservoir 48. Specifically, an elongated pipe 50 extends from the base of the evaporation pan 46 to the base of the fluid reservoir 48 and allows fluid within the fluid reservoir 48 to travel into the evaporation pan 46. In operation, therefore, a known relationship exists between a decrease in fluid level 52 within evaporation pan 46, and the corresponding decrease of the fluid level 54 within fluid reservoir 48. The relationship depends largely on the diameter of the evaporation pan 46 with respect to that of the fluid reservoir 48, as is understood to one having ordinary skill in the art. The fluid reservoir 48 operates in a similar manner with the precipitation gage as described in FIG. 1. However, the rod 56 is suspended from the top of the catch tube 58 and has a float 60 that will lower as the fluid level 54 lowers, thereby providing a relationship between the evaporation rate and the fluid level 52. Accordingly, the data logger 26 will provide data relating to the evaporation rate over a given period of time.

Referring now to FIGS. 7–9, a precipitation gage 110 in accordance with another embodiment is illustrated having reference numerals corresponding to similar parts of the precipitation gage 10 of FIGS. 1–3 incremented by one hundred. In particular, the precipitation gage 110 includes an elongated cylindrical magnetostrictive tube 141 disposed adjacent and connected to the catch tube 112 by one of any known suitable methods. A magnetostrictive transducer head 124 is disposed on top of the tube 141, and is connected to a magnetostrictive rod 118 that extends downwardly therefrom and includes a float 120, which operates as described above. An aperture 142 exists at the bottom between the tubes 112 and 141 to permit fluid entering the catch tube to flow into the magnetostrictive tube 141 to facilitate measurement of the fluid level 122. The magnetostrictive tube 141 may be clear with having a fluid level sight gage to allow a user to obtain visual readings of the fluid level 122.

The embodiment illustrated in FIGS. 7–9 allows increased ease of maintenance by allowing access to the precipitation gage 110 from above the fluid level 122, thereby eliminating the need to drain the gage prior to maintenance. A stop may exist on the bottom of the rod to allow retrieval of the float 120 when the rod 118 is removed during, for example, rod replacement. It is furthermore recognized that the accuracy of the precipitation measurements is increased as the opening 116 of the precipitation gage 110 approaches ground level. Accordingly it is desirable to bury a significant portion of the precipitation gage 110. Because the magnetostrictive head 124 is positioned on top of the tube 141, the gage 110 may be buried while allowing access to the electronics for maintenance purposes. It should be appreciated, in this embodiment, that the diameter of the magnetostrictive tube 141 is preferably minimized to increase accuracy the correlation between the fluid level 122 detected in the magnetostrictive tube 141 and that in the catch tube.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

I claim:

1. A method for measuring precipitation over a given period of time using a magnetostrictive precipitation gage including an elongated catch tube having an outer wall defining an upwardly facing opening at one end, and a base disposed at a second, opposite end of the walls, wherein the catch tube is configured to receive precipitation therein, and further including a magnetostrictive transducer having a buoyant magnetized float that is movable linearly along a vertically oriented magnetostrictive rod, the method comprising the steps of:

a) receiving an unknown amount of precipitation within the opening to produce a precipitation level within the catch tube, wherein a vertical position of the float provides an indication of the precipitation level;

b) determining the position of the float with respect to the rod, based on a magnetic interaction between the float and the rod;

c) determining the precipitation level based on the vertical position of the float; and d) based on the precipitation level, determining the amount of unknown precipitation in the catch tube.

2. The method as recited in claim 1, wherein the magnetostrictive transducer emits signals corresponding to the vertical position of the float to a data processor wherein step (c) further comprises processing the signals to determine the vertical position of the float.

3. The method as recited in claim 2, wherein the data processor receives a plurality of signals so as to compute an amount of precipitation over a given period of time.

4. The method as recited in claim 1, wherein the outer wall defining the opening of the catch tube is beveled.

5. The method as recited in claim 1 further comprising enclosing the rod and float with a an elongated a rod cover having an outer wall defining an open bottom and inner cavity configured to receive the rod and float therein, and having a closed top so as to prevent precipitation from accumulating on the rod and float.

6. The method as recited in claim 5, wherein a plurality of holes exist in the bottom of the rod cover so as to permit fluid disposed within the catch tube to travel inside the rod cover to produce a precipitation level inside the rod cover that is equal to the precipitation level in the catch tube.

7. A magnetostrictive precipitation gage configured to measure an amount of precipitation generated over a given period of time, the precipitation gage comprising:

an elongated catch tube having an outer wall defining an upwardly facing opening at one end, and a base disposed at a second end opposite the first end, wherein the catch tube is configured to receive an amount of precipitation therein;

a magnetostrictive transducer rod connected to the base and extending vertically upwardly within the catch tube and aligned with the opening, wherein the rod receives a buoyant magnetized float that is displaceable linearly along the rod;

a data processor electrically coupled to the rod and configured to receive signals therefrom indicating the vertical position of the float, wherein the vertical position of the float provides an indication of the amount of precipitation.

8. The precipitation gage of claim 7, wherein the precipitation produces a precipitation level within the catch tube, and wherein the vertical position of the float provides an indication of the precipitation level, and wherein a known relationship exists between the precipitation level and the amount of precipitation received within the catch tube.

9. The precipitation gage of claim 7, wherein edges defining the outer wall opening are beveled.

10. The precipitation gage of claim 7, further comprising an elongated rod cover having an outer wall and a base connected to the outer wall defining an open bottom and an inner cavity configured to receive the rod and float therein, wherein the cover has a closed top so as to prevent precipitation from accumulating on the rod and float, and wherein the base provides supports the rod cover when disposed within the catch tube.

11. The precipitation gage of claim 10, further comprising a plurality of holes in the bottom of the rod cover so as to permit fluid disposed within the catch tube to travel inside the rod cover to produce a precipitation level inside the rod cover that is equal to the precipitation level in the catch tube.

12. The precipitation gage of claim 7, wherein the base defines a surface area no greater than the surface area of the opening.

13. The precipitation gage of claim 10, wherein the rod cover has a pointed upper surface.

14. A magnetostrictive precipitation gage configured to measure an amount of precipitation generated over a given period of time, the precipitation gage comprising:

an elongated catch tube having an outer wall defining an upwardly facing opening at one end, and a base disposed at a second end opposite the first end, wherein the catch tube is configured to receive an unknown amount of precipitation that produces a precipitation level therein;

a housing disposed adjacent and in fluid communication with the catch tube to produce a precipitation level within the housing, the housing enclosing a magnetostrictive transducer rod extending vertically therein and that receives a buoyant magnetized float that is linearly displaceable along the rod, wherein the position of the float is indicative of the precipitation level of the catch tube; and electronic circuitry connected to the precipitation gage, wherein the magnetostrictive transducer is configured to send signals to the circuitry indicating the vertical position of the float.

15. The precipitation gage of claim 14, further comprising a data processor electrically coupled to the electronic circuitry and configured to receive signals therefrom to determine, based on the precipitation level of the catch tube, the unknown amount of precipitation within the catch tube.

16. The precipitation gage of claim 14, wherein the housing includes an outer wall and upper and lower walls so as to enclose the rod and float, wherein the rod is suspended from the upper wall.

17. The precipitation gage of claim 16, wherein the catch tube and housing are mechanically connected to one another, and wherein the outer walls of the housing and catch tube define an aperture extending therethrough and connecting a lower end of the housing with a lower end of the catch tube, wherein the precipitation level within the housing has a predefined relationship with respect to the precipitation level within the catch tube.

18. The precipitation gage of claim 14, wherein a substantial portion of the catch tube is buried underground while the upwardly facing opening is above ground.

* * * * *